(12) United States Patent
Wang et al.

(10) Patent No.: US 12,147,738 B2
(45) Date of Patent: Nov. 19, 2024

(54) RESERVOIR SIMULATION UTILIZING HYBRID COMPUTING

(71) Applicant: Landmark Graphics Corporation, Houston, TX (US)

(72) Inventors: Qinghua Wang, Katy, TX (US); Hanife Meftun Erdogan, Houston, TX (US); Dong Li, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 814 days.

(21) Appl. No.: 17/305,041

(22) Filed: Jun. 29, 2021

(65) Prior Publication Data
US 2022/0414285 A1   Dec. 29, 2022

(51) Int. Cl.
*G06F 30/20* (2020.01)
*G01V 20/00* (2024.01)
*G06F 111/10* (2020.01)

(52) U.S. Cl.
CPC .............. *G06F 30/20* (2020.01); *G01V 20/00* (2024.01); *G06F 2111/10* (2020.01)

(58) Field of Classification Search
None
See application file for complete search history.

(56) References Cited

U.S. PATENT DOCUMENTS

| | | | |
|---|---|---|---|
| 8,994,739 B2* | 3/2015 | Killough | G06F 30/23 345/520 |
| 10,352,134 B2 | 7/2019 | Wang et al. | |
| 10,634,814 B2* | 4/2020 | Klie | G06F 17/10 |
| 10,670,770 B2 | 6/2020 | Wang et al. | |
| 11,651,470 B2* | 5/2023 | Zad | G06F 9/4881 345/504 |
| 2007/0279429 A1* | 12/2007 | Ganzer | G06T 15/005 345/582 |
| 2008/0021679 A1* | 1/2008 | Bleiweiss | G06F 30/20 703/2 |
| 2008/0129748 A1 | 6/2008 | Bakalash et al. | |
| 2012/0004892 A1* | 1/2012 | Pita | G01V 20/00 703/10 |
| 2014/0015841 A1 | 1/2014 | Killough | |
| 2014/0049549 A1 | 2/2014 | Lukyanov et al. | |
| 2014/0379320 A1 | 12/2014 | Tal et al. | |
| 2015/0168599 A1 | 6/2015 | Killough | |

FOREIGN PATENT DOCUMENTS

KR   101245994 B1   3/2013

OTHER PUBLICATIONS

"PCT Application No. PCT/US2021/039978, International Search Report and Written Opinion", Mar. 10, 2022, 11 pages.
(Continued)

*Primary Examiner* — Elias Mamo
(74) *Attorney, Agent, or Firm* — DeLizio, Peacock, Lewin & Guerra, LLP (57) ABSTRACT

Hybrid computing that utilizes a computer processor coupled to one or more graphical processing units (GPUs) is
(Continued)

configured to perform computations that generate outputs related to reservoir simulations associated with formations that may include natural gas and oil reservoirs.

20 Claims, 5 Drawing Sheets

(56) References Cited

OTHER PUBLICATIONS

Alam, et al., "Accelerator Aware MPI Micro-benchmarking using CUDA, OpenACC and OpenCL", [online] Retrieved on Apr. 26, 2021 from https://prace-ri.eu/wp-content/uploads/wp119.pdf, 2014, 9 pages.

Benner, et al., "Using Hybrid CPU-GPU Platforms to Accelerate the Computation of the Matrix Sign Function", In: Lin HX. et al. (eds) Euro-Par 2009—Parallel Processing Workshops. Euro-Par 2009. Lecture Notes in Computer Science, vol. 6043. Springer, Berlin, Heidelberg. https://doi.org/10.1007/978-3-642-14122-5_17, 2010, 8 pages.

Cabezas, et al., "GPU-SM: Shared Memory Multi-GPU Programming", Proceedings of the 8th Workshop on General Purpose Processing using GPUs, GPGPU 8 , Feb. 7, 2015, San Francisco, CA, USA, 12 pages.

Fujii, et al., "Data Transfer Matters for GPU Computing", International Conference on Parallel and Distributed Systems, Dec. 15-18, 2013, Seoul, Korea (South), 8 pages.

Gregg, et al., "Where is the Data? Why You Cannot Debate CPU vs. GPU Performance Without the Answer", IEEE International Symposium on Performance Analysis of Systems and Software, ISPASS 2011, Apr. 10-12, 2011, Austin, TX, USA, 11 pages.

Kronbichler, et al., "Which Architecture Is Better Suited for Matrix-Free Finite-Element Algorithms: Intel Skylake or Nvidia Volta?", The International Conference for High Performance Computing, Networking, Storage, and Analysis, SC'18, Nov. 2018, Dallas, Texas USA, 3 pages.

Shi, et al., "Benchmarking State-of-the-Art Deep Learning Software Tools", 7th International Conference on Cloud Computing and Big Data (CCBD), Nov. 16-18, 2016, Macau, China, 7 pages.

Sourouri, et al., "Effective Multi-GPU Communication Using Multiple CUDA Streams and Threads", 20th IEEE International Conference on Parallel and Distributed Systems (ICPADS), Hsinchu, Taiwan, 2014, 6 pages.

* cited by examiner

RESERVOIR SIMULATION UTILIZING HYBRID COMPUTING

TECHNICAL FIELD

The disclosure generally relates to computing systems and methods for reservoir simulation associated with natural gas and oilfield production.

BACKGROUND

Simulation of oil and gas reservoirs is important to the financial health of oil and gas exploration and production corporations. Reservoir simulation is important to the financial success of oil and gas exploration and production companies because reservoir simulation aids in the understanding of chemical, physical, and fluid flow processes occurring in a petroleum reservoir. This understanding can help operators predict future behavior of a reservoir and maximize recovery of hydrocarbons from the reservoir. Because properties and processes of a reservoir are complex, operators run computer programs, often referred to as reservoir simulators, to perform reservoir simulation through generation of a model of a reservoir.

BRIEF DESCRIPTION OF THE DRAWINGS

Embodiments of the disclosure may be better understood by referencing the accompanying drawings.

The drawings are provided for the purpose of illustrating example embodiments. The scope of the claims and of the disclosure are not necessarily limited to the systems, apparatus, methods, or techniques, or any arrangements thereof, as illustrated in these figures. In the drawings and description that follow, like parts are typically marked throughout the specification and drawings with the same or coordinated reference numerals. The drawing figures are not necessarily to scale. Certain features of the invention may be shown exaggerated in scale or in somewhat schematic form, and some details of conventional elements may not be shown in the interest of clarity and conciseness.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to computing systems and methods for modeling reservoir simulations in illustrative examples. However, the computing systems and methods described herein are not limited to use with reservoir simulation modeling, and may be utilized for any type of model and/or simulation that requires a large amount of data and/or requires intensive computer processing to be performed.

The embodiments described herein relate to systems, apparatus, methods, and techniques that may be used to provide computations that result in the generation of outputs, such as reports and/or graphical outputs, which are related to reservoir simulation. Reservoir simulations are important tools in the area of natural gas and oilfield exploration and production. Design of production facilities related to natural gas and oilfield production involves choice of wellbore locations and injected chemicals, well shapes and dimensions, pipe and pump networks, drilling schedules, production schedules, etc. The optimal choices of these and other parameters depend on physical properties of formation materials that includes natural gas and oil reservoir, wherein such physical properties may include pressures, saturations, porosities, and possibly others. Such choices are often facilitated by computer simulation that simulate production for existing or hypothetical production facilities and production schedules. As a starting point, test measurements are made at selected locations in reservoirs and/or in existing production facilities to determine parameters of interest. The test data may include geological data from sources such as seismic analysis, rock cores, and well logs. These data may include data on rock porosities, permeabilities, and other information of interest, and allow determination of parameters of interest such as pressures or saturations at a number of locations. The test measurements may be collected from various sources and stored in a computer memory device.

Using this stored data, embodiments as described herein include computer systems and methods of computation that utilize a reservoir simulator program to read the stored data and to provide simulated results which can be stored in a computer memory device and/or displayed on a printed output, a computer monitor, and/or other output device(s), and/or provided to another computer program or another computer over a network or otherwise, for use by oil field designers or other personnel.

In a proposed GPU centered hybrid parallel solution for reservoir simulation, over 80% of computation load is on GPUs, and CPUs are responsible for I/O, the overall execution flow control, and some minor parallel computations that do not fit for GPUs. Work data and all solver related data are stored on GPUs. CPUs prepare the data, and GPUs load up the data and do the computations and send back the solutions. When the model is large enough, multiple cluster nodes with GPUs might be needed. Message Passing Interface (MPI) may be used for data exchanges between GPUs or CPUs. Most computational modules, with linear solvers in reservoir simulations being one possible exception, are embarrassingly parallel. The term "embarrassingly parallel" refers to systems and/or computer configurations where there is no direct communication between different CPUs included in the system/computer configuration, and no direct communication between different GPUs included in the system/computer configuration. The data exchange between CPUs and GPUs is thru a PCIe connections, and the communication between GPUs on the same node may go thru the Nvlink. Given the size of data that GPUs can handle, the PCIe bandwidth definitely limits the overall performance, and the Infiniband connection between High Performance Computing (HPC) nodes is another concern.

Various embodiments described herein include a pipelining method designed to hide data transfers between GPUs and CPUs. Hiding data transfers refers to overlapping the task of the data transfer with a local computation task or tasks so that the overall elapsed time does not increase. In other words, hiding data transfers includes performing two simultaneous tasks, e.g., performing the data transfer(s) while continuing to perform local computational tasks, as opposed to performing these two tasks in a sequential way.

In various embodiments, a computation domain on each process is partitioned into smaller sub-domains, and a processor of a CPU keeps assembling the data for each small sub-domain while the GPU fetches data and processes it. There is no synchronization until all the small sub-domains are processed, referring to the GPU assuring that data from the CPU reaches the memory of the GPU to avoid processing incomplete data. In addition to pipelining, domain coloring for computational decoupling may be utilized in various embodiments as further described herein. These processing systems and methods may provide one or more of the following benefits:

1) Improve reservoir simulation performance and reduce simulation turn-around time on the hybrid parallel system;
2) Consolidate great computation capacity to a small standalone unit (for example Azure Stack or a GPU server) that can run large size simulation models; and
3) Reduce computation cost.

Figure 1:
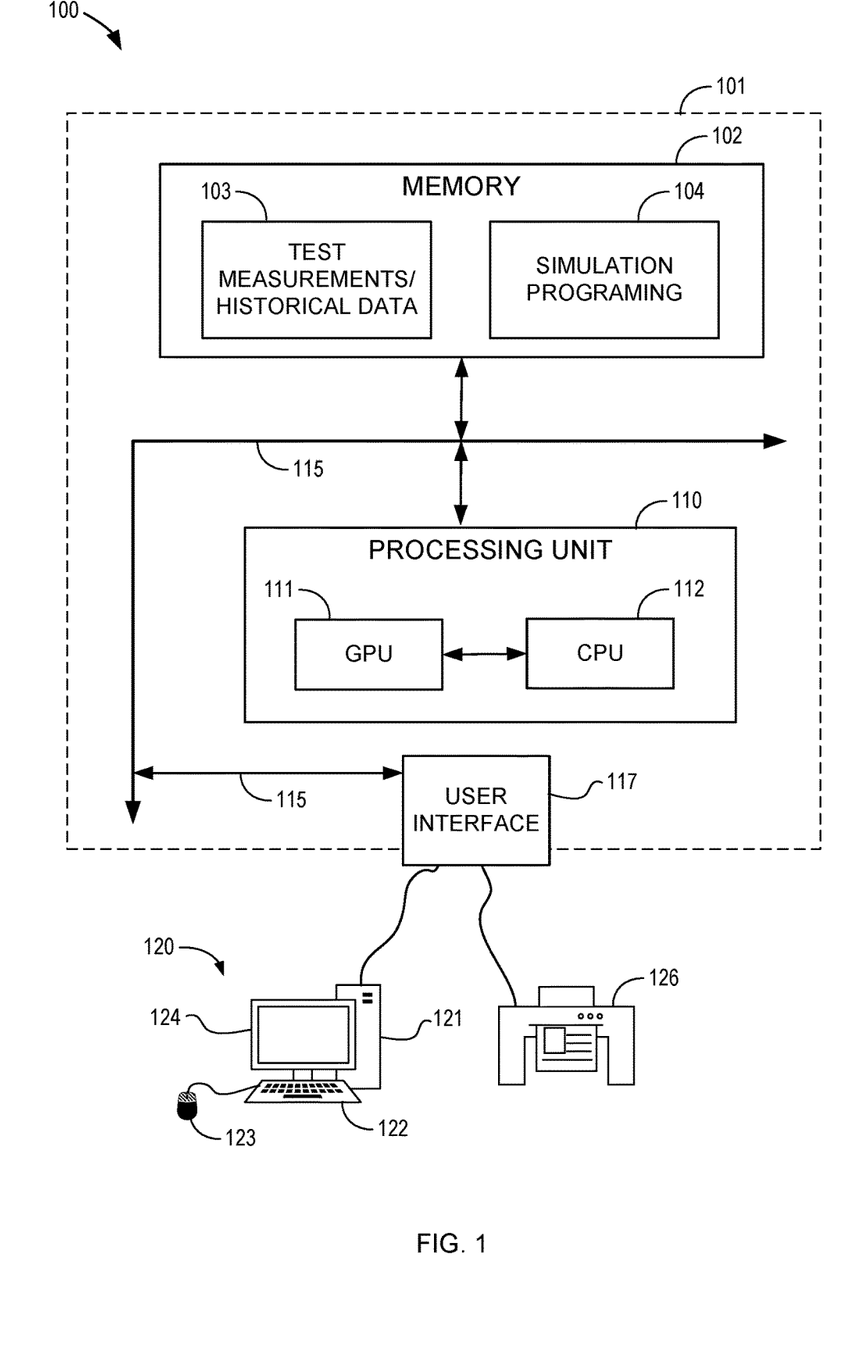
FIG. 1 is a block diagram illustrating a computer system configured to perform operations related to reservoir simulation according to various embodiments.

FIG. 1 is a block diagram illustrating a computer system (system) 100 configured to perform operations related to reservoir simulation according to various embodiments. As illustrated in FIG. 1 system 100 includes a computing system 101, sometimes referred to as a computing unit, which includes memory 102 communicatively coupled to a processing unit 110 via a bus 115. In various embodiments, memory 102 includes a test measurements/historical data block (data) 103 and simulation programming 104. Data 103 may include any type of data, such as data collected from actual measurements made related to a particular formation, and/or historical data collected at some time in the past regarding a particular formation, which is to be operated on by the simulation programming in order to generate an output, such as reservoir simulation data or model, which is related to the formation. Simulation programing 104 may include any type of algorithms and/or programming code that may be utilized to process the data included in data 103, and to generate an output, including any type of data and/or graphical information related to a reservoir simulation model.

Computing system 101 includes one or more graphical processing units (GPU) 111 communicatively coupled to one or more general purpose or central processing units (CPU) 110. CPU 110 may be configured to operate, using simulation programming 104, to oversee and control the operations of the reservoir simulation programming, wherein the majority of computations on the data itself may be performed by GPU 111, including for example but not limited to computations performed on the data included in data 103, in order to provide an output related to reservoir simulation using any of the techniques described throughout this disclosure, and/or any equivalents thereof. The simulation programming 104 of memory 102 primarily stores the application programs, which may also be described as program modules containing computer-executable instructions, that are executed by the processing unit 110 for implementing the generation of reservoir simulation models as described herein.

Although the computing system 101 is shown as having a generalized memory, the computing system typically includes a variety of computer readable media. By way of example and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example and not limitation, the computing unit includes an operating system, application programs, other program modules, and program data. The components of memory 102 may also be included in other removable/non-removable, volatile/nonvolatile computer storage media or they may be implemented in the computing unit through application program interface ("API") or cloud computing, which may reside on a separate computing unit connected through a computer system or network. For example, in various embodiments a hard disk drive may read from or write to non-removable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

Processing unit 110 may be configured to provide any of the features, and to perform any of the functions described throughout this disclosure, including operational techniques used to perform reservoir simulations as described herein, and any equivalents thereof. In various embodiments, GPU 111 may a single GPU configured to perform computations related to reservoir simulations. In various embodiments, GPU 111 may comprise a cluster of GPS communicatively coupled together, and configured according to any of the embodiments described herein, or any equivalents thereof. For example, GPU 111 may include one or more clusters of GPUs, wherein each cluster includes a one or more GPUs interconnected to one another within a given cluster, and further communicatively connected to one another through a connective bus, for example as further illustrated and described below with respect to FIG. 2.

Referring again to FIG. 1, GPU 111 may include multiple GPUs, each GPU configured to perform computations by accessing data from a portion of memory pinned as a sub-domain for that GPU, and to exchange data with another GPU accessing data from a different portion of memory pinned to the other GPU, for example as illustrated and described below with respect to FIG. 3. In various embodiments, the memory domain(s) associated with GPUs included in GPU 111 may be configured to include interior cells and boundary cells, for example as illustrated and described below with respect to FIG. 4, and/or may include designated domain areas, such as color designated areas, which define the order of data computation, for example as illustrated and described below with respect to FIG. 5. GPU 111 and CPU 112 of system 100 may be configured to perform any of the methods, or steps thereof, as described throughout this disclosure.

Referring again to FIG. 1, embodiments of system 100 include a user interface computer (computer) 120 communicatively coupled to computing system 101 through user interface 117. Computer 120 may include a computing device, such as personal computer (PC) 121, and various Input/Output (I/O) devices, such as keyboard 122 and computer mouse 123, which allows a user to provide inputs to PC 121, and thus to computing system 101. Computer 120 may further include a monitor 124 configured to provide a display of information, such as text and graphical information. In various embodiments, monitor 124 is also configured as an in input device, for example as a touch screen, allowing a user to provide inputs to PC 121, and thus also to computing system 101. In various embodiments, computer 120 may be configured to allow a user to initiate and/or to control the reservoir simulation functions being provided through computing system 101. In various embodiments, computer 120 may be used to view, modify, and/or to otherwise manipulate the data stored at data 103, and/or to update the programming provided at simulation programming 104.

In various embodiments, system 100 includes an graphical output device 126, such as a printer or a plotter, which may be coupled to system 100 through user interface 117. In various embodiments, graphical output device 126 may be configured to produce graphical outputs, such as printed reports and/or graphical depictions, of various aspects of the reservoir simulations produced by computing system 101.

While system 100 has been described in connection with the arrangement as illustrated in FIG. 1, it will be understood by those skilled in the art that it is not intended to limit the configuration of a computing system utilizing one or more of the arrangements and techniques for reservoir simulation modeling as described herein. It is therefore contemplated that various alternative embodiments and modifications may be made to the disclosed computing systems as described herein without departing from the spirit and scope of the embodiments and method for reservoir simulation modeling as defined by the appended claims and equivalents thereof.

Figure 2:
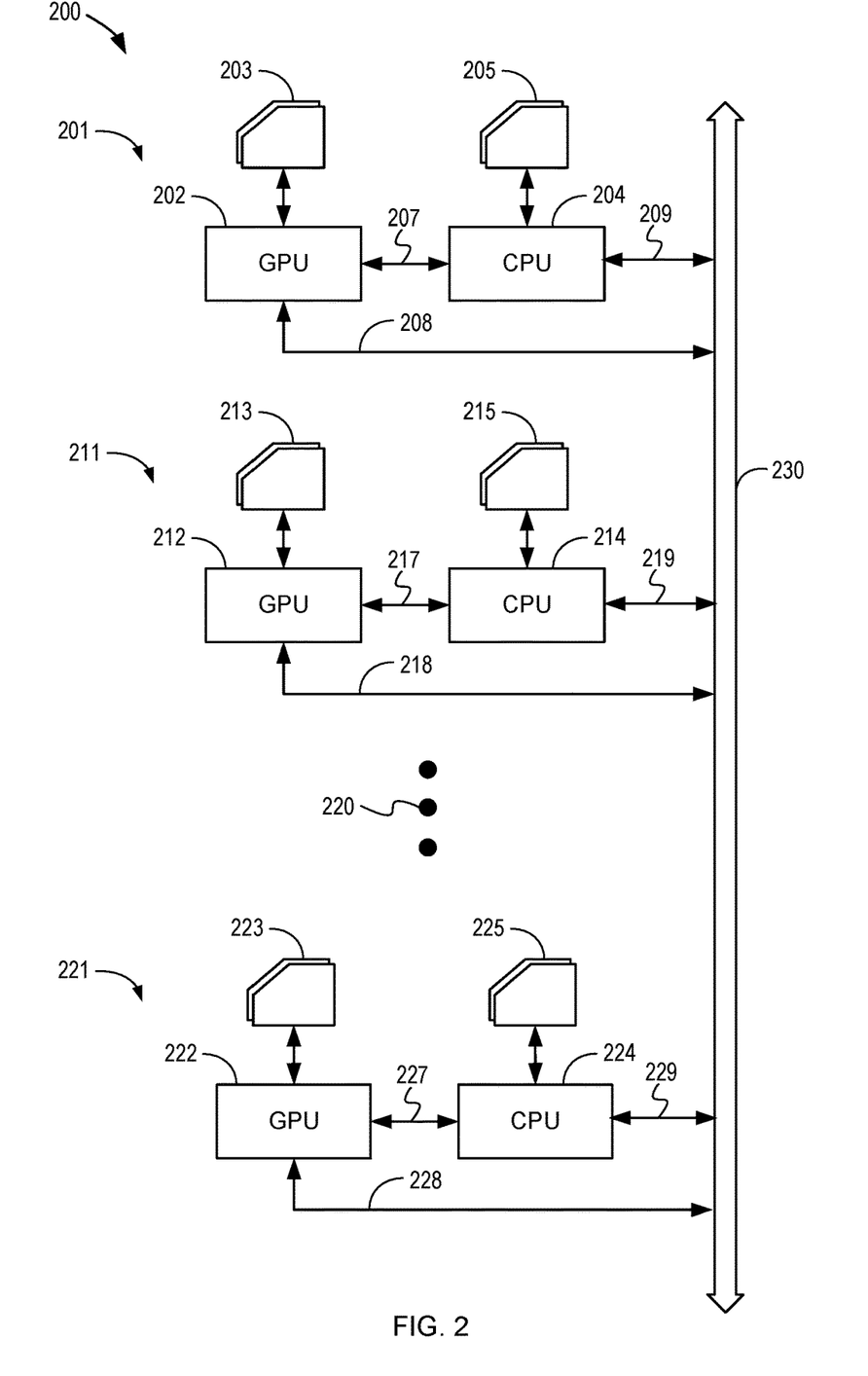
FIG. 2 is a block diagram illustrating a plurality of processing units according to various embodiments.

FIG. 2 is a block diagram 200 illustrating a plurality of processing units 201, 211, 221, according to various embodiments. In various embodiments, one or more of processing units 201, 211, 221 may represent in whole or in part the processing unit 101 as illustrated and described above with respect to FIG. 1. As shown in FIG. 2, each of the processing units includes a GPU block communicatively coupled to a CPU block. For example, processing unit 201 includes GPU block 202 communicatively coupled to CPU block 204 through interconnection 207. In various embodiments, interconnection 207 comprises a Peripheral Component Interconnect Express (PCIe) compliant connection. GPU block 202 is coupled to data 203, which includes data directly accessible by any GPU included in GPU block 202. CPU block 204 is coupled to data 205, which includes data directly accessible by any CPU included in CPU block 204. CPU block 204 is further coupled through interconnect 209 to bus 230. In various embodiments, interconnect 209 is an InfiniBand (IB) compliant interconnect. In various embodiments, CPU block 204 is configured to control and oversee operations being performed by GPU block 202, including operations to provide outputs related to reservoir simulations. In various embodiments, processing unit 201 is configured so that at least eighty percent of the computational load associated with reservoir simulation modeling being performed at least in part by processing unit 201 is performed by the GPU block 202, wherein CPU block 204 provides services such as managing I/O functions, pinning data to memory zones for access by the GPU block 202, and other types of overhead managements task that are not necessarily better handled by the GPUs of block 202.

In various embodiments, the GPUs included in GPU bock 202 are configured to handle the communication overhead between GPUs within the block in a matter the same as or in a similar manner as described with respect to GPU1 310 and GPU2 320 as illustrated and described below with respect to FIG. 3, or any of the GPUs as further illustrated and described below with respect to FIG. 4 and FIG. 5. In addition, as illustrated in FIG. 2 GPU block 202 is communicatively coupled to bus 230 through interconnect 208, and thus may communicate with and/or exchange data with other processing units that may be coupled together through bus 230. In various embodiments, bus 230 is an InfiniBand bus, and interconnection 208 utilizes directly accessing GPU device memory over the PCIe bus via interconnect 208.

Still referring to FIG. 2, and depending in some embodiments on the size of the simulation model, multiple processing units may be utilized to process the required data and produce the required simulation output. As illustrated in FIG. 2, an additional processing unit 211, including GPU block 212 coupled to CPU block 214 via interconnect 217 is provided. In various embodiments, interconnection 217 comprises a PCIe compliant connection. GPU block 212 is configured to directly access data 213, and CPU block 214 is configured to directly access data 215. CPU block 214 is further coupled through interconnect 219 to bus 230. In various embodiments, interconnect 219 is an InfiniBand (IB) compliant interconnect. In addition, GPU block 212 is communicatively coupled to bus 230 through interconnect 218, and thus may communicate with and/or exchange data with other processing units that may be coupled together through bus 230. Processing unit 211 in various embodiments is configured to perform any of the same or similar functions, and/or to provide any of the same or similar features as described above with respect to processing unit 201.

The number of processing units that may be included in a system such as the system represented by the block diagram 200 of FIG. 2 is not limited to any particular number of processing units, and may include up to "N" processing units, as illustratively represented by processing unit 221 and dots 220. As illustrated in FIG. 2, processing unit 221 represents the "N" processing unit of the system, wherein "N" represents the positive integer number of processing units that are included in the system of FIG. 2. As illustrated in FIG. 2, the "Nth" processing unit 221 includes GPU block 222 coupled to CPU block 224 via interconnect 227. In various embodiments, interconnection 227 comprises a compliant connection. GPU block 222 is configured to directly access data 223, and CPU block 224 is configured to directly access data 225. CPU block 224 is further coupled through interconnect 229 to bus 230. In various embodiments, interconnect 229 is an InfiniBand (IB) compliant interconnect. In addition, GPU block 222 is communicatively coupled to bus 230 through interconnect 228, and thus may communicate with and/or exchange data with other processing units that may be coupled together through bus 230. Processing unit 221 in various embodiments is configured to perform any of the same or similar functions, and/or to provide any of the same or similar features as described above with respect to processing unit 201.

Figure 3:
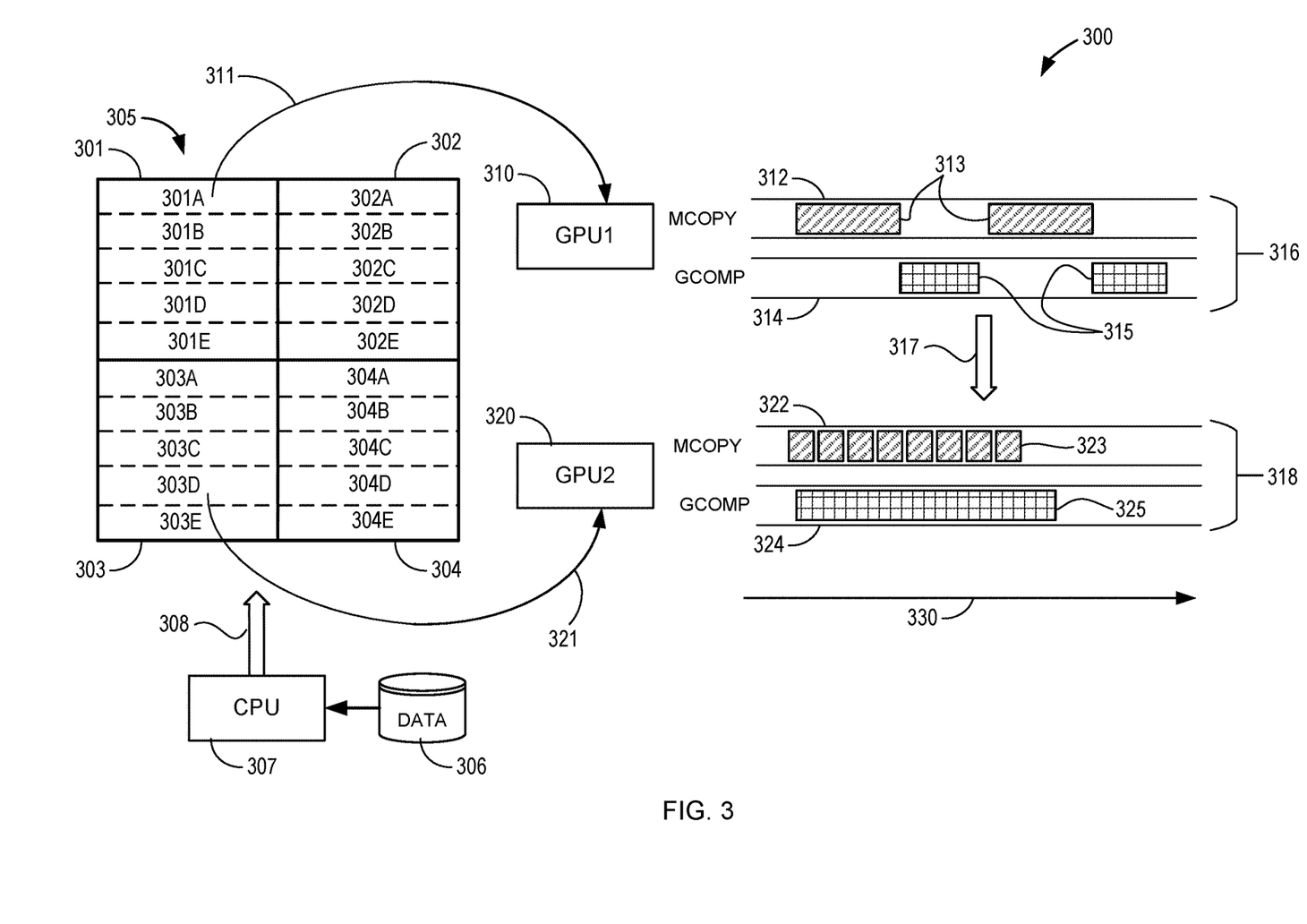
FIG. 3 is a functional block diagram illustrating pipelining of data handling between CPUs and GPUs according to various embodiments.

FIG. 3 is a functional block diagram 300 illustrating pipelining of data handling between CPUs and GPUs according to various embodiments. As shown in diagram 300, a computation domain 305 is decomposed into a plurality of sub-domains 301, 302, 303, and 304. A computation domain refers to a numerical presentation of a physical domain in which the physical features are described by a numerical model, for example a reservoir simulation model. Data 306 related to the reservoir simulation model to be processed is accessed by CPU 307, whcih may comprise one or a plurality of processors. The sub-domains are loaded to CPU 307, wherein the processor(s) of CPU 307 are configured to assemble the data and store the assembled data into a pinned memory zone within each of the sub-domains 301, 302, 303, and 304, as illustratively represented by arrow 308. In various embodiments, assembling the data includes putting matrix equations for a numerical model into a particular format so that the linear systems can be efficiently solved. In various embodiments, a Direct Memory Access (DMA) engine then copies the data from one of the sub-domains to a GPU, where the GPU then processes the data.

By way of example, as shown in diagram 300, GPU1 310 is configured to access data from sub-domain 301, (illustratively represented by arrow 311), which has been assembled by a processor of CPU 307, and pinned to a memory zone within sub-domain 301. In various embodiments, sub-domain 301 may be further divided into smaller sub-domains 301A-301E. In such embodiments, the processor may assemble data for a particular one of the smaller sub-domains, and once the data for that smaller sub-domain has been assembly, the DMA engine copies the data from the smaller sub-domain to GPU1 310 for processing, while in parallel the processor continues to assembly data for other ones of the smaller sub-domains included within sub-domain 301. In this matter, portions of the data that has been assembled may be pipelined to the associated GPU for processing without waiting for all the data to be included in and assembled for sub-domain 301 to have been assembled. This pipelining of the assembly data from each smaller sub-domain allows for overall faster processing of the data associated with a given sub-domain, such as sub-domain 301.

Similarly, data assembled by the processor for sub-domain 303 may be copied to a second GPU, such as GPU2 320 as shown in diagram 300 (illustratively represented by arrow 321), wherein the copied data may be processed by GPU2 320 in parallel with the data processing being provided by GPU1 310. Further, sub-domain 303 may be further decomposed into smaller sub-domains 303A-303E in a manner the same as or similarly to that described above with respect to sub-domain 301. If sub-domain 303 is further divided into smaller sub-domains 303A-303E, the data from these smaller sub-domains may be copied to GPU2 320 and processed by GPU2 320 as the data for each individual smaller sub-domain is assembled by the processor without the need to have all the data included in all of the smaller sub-domains of sub-domain 303 have been fully assembled.

The copying of data to GPU1 310, and the processing of that copied data by GPU1 310, is illustrated by the data handling tracks shown in diagram 300 to the left-hand side of bracket 316. As illustrated in diagram 300, the top track 312 is labeled "MCOPY" and represents data blocks 313 that have been transferred to GPU1 310 for processing. The bottom track 314 is labeled "GCOMP" and represents data blocks 315 that have been processed by GPU1 310. Similarly, the copying of data to GPU2 320, and the processing of that copied data by GPU2 320, is illustrated by the data handling tracks shown in diagram 300 to the left-hand side of bracket 318. As illustrated in diagram 300, the top track 322 is labeled "MCOPY" and represents data blocks 323 that have been transferred to GPU2 320 for processing. The bottom track 324 is labeled "GCOMP" and represents data blocks 325 that have been processed by GPU2 320. In diagram 300, elapsed time related to the processing of data at bracket 316 and bracket 318 is illustratively represented by arrow 330 extending in a right-hand direction in the diagram.

In addition to the data transferred to the GPUs for processing from the sub-domains 301 and 303, data may be transferred from one GPU to another, for example from GPU1 310 to GPU2 320 as illustratively represented by arrow 317. In various embodiments, the data transferred from one GPU to another GPU is data the has been processed, for example as data block 315 in track 314, by a first GPU, and is transferred to the second GPU for further processing. These GPU to GPU transfers of data further help to reduce the overhead data handling that would otherwise be required if the processor assembling the data was also required to handle the data transfers between the GPUs. In various embodiments, the transfer of data from one GPU to another GPU may be done asynchronously. Asynchronous data transfer in various embodiments means that as soon as a GPU (requesting GPU) initializes a data request from another GPU, the requesting GPU continues to perform local computations without being idle. Once the data from the another GPU arrives at the requesting GPU, the requesting GPU starts processing the newly arrived data. In various embodiments, an alternative and/or opposite scheme for data transfers comparted to asynchronous data transfer is the synchronous data transfer, in which the requesting GPU remains idle until the data from another GPU arrives.

The number of sub-domains that may be included in a computation domain is not limited to a particular number of sub-domains. As a non-limiting example, computation domain 305 as illustrated in diagram 300 includes four sub-domains, including sub-domains 301 and 303 as described above, and additional sub-domains 302 and 304. Each of the additional sub-domains may be further decomposed into smaller sub-domains, for example smaller sub-domains 302A-302E and sub-domains 304A-304E, respectively for sub-domains 302 and 304, and may be configured to operate as described above with respect to smaller sub-domains 301A-301E and smaller sub-domains 303A-303E. These additional sub-domains 302 and 304 may be configured to provide data to additional GPUs (not shown in diagram 300), and/or to one or both of GPU1 310 and GPU2 320. Further, data processed by any of the GPUs receiving and processing data from the additional sub-domains 302 and/or 304 may be configured to exchange processed data with one or more other GPUs receiving and processing data from any other of the sub-domains included in computation domain 305.

By using the processed described above for dividing the computational domain into sub-domains, and in some embodiments further dividing the sub-domains into smaller sub-domains, along with having a processor or processors that assemble the data into pinned memory zones within these sub-domains/smaller sub-domains, and then copying that the assembled data to a plurality of GPUs for processing, the advantages of off-loading the processing to the GPUs, along with accommodating parallel processing of data by a plurality go GPUs while also accommodating data transfers between GPUs without the need to involve the processor, may contribute to a more powerful and more rapid processing of data in order to generate outputs associated with a reservoir simulation model.

Figure 4:
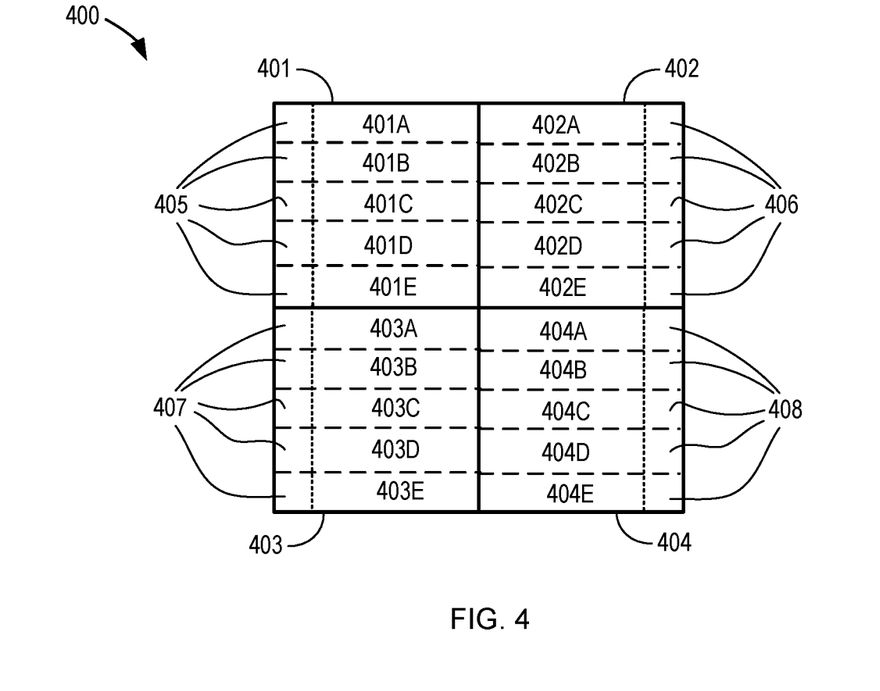
FIG. 4 is a block diagram 400 illustrating of a plurality of GPUs having cells divided into interior cells and boundary cells according to various embodiments.

FIG. 4 illustrates a block diagram 400 of a plurality of GPUs having cells divided into interior cells and boundary cells according to various embodiments. The term "cells" as used herein may refer to small meshes or individual memory portions, which may be allocated so that mathematical equations can be discretized and solved. As illustrated in FIG. 4, the plurality of GPUs includes a first GPU 401, a second GPU 402, a third GPU 403, and a fourth GPU 404. GPUs 401, 402, 403, and 404 may represent any of the GPUs illustrated and described throughout this disclosure. As further illustrated in FIG. 4, each of the respective GPUs 401, 402, 403, and 404 includes a domain that is divided into a set of interior cells and a set of boundary cells. For example, GPU 401 includes a set of interior cells 401A-401E and a set of boundary cells 405, GPU 402 includes a set of interior cells 402A-402E and a set of boundary cells 406, GPU 403 includes a set of interior cells 403A-403E and a set of boundary cells 407; and GPU 404 includes a set of interior cells 404A-404E, and a set of boundary cells 408. Each of the interior cells and the boundary cells associated with a particular GPU include data on which the associated GPU is configured to operate. The boundary cells are cells that connect to other domains, and the interior cells are cells that only connect to other cells within the same domain. In various embodiments, cells are referred to as being "connected" if a cell share a face or an edge with another cell.

Using the domain of GPU 401 as an example, interior cells 401A-401E are cells that connect only to cells within the domain for GPU 401, and boundary cells 405 are cells that connect to one or more other GPU domains, for example boundary cells 406, 407, and/or 408 of GPUs 402, 403, and/or 404, respectively. Similarly, interior cells 402A-402E of GPU 402 are cells that connect only to cells within the domain for GPU 402, while boundary cells 406 are cells that connect to one or more other GPU domains; interior cells 403A-403E of GPU 403 are cells that connect only to cells within the domain for GPU 403, while boundary cells 407 are cells that connect to one or more other GPU domains; and interior cells 404A-404E of GPU 404 are cells that connect only to cells within the domain for GPU 404, while boundary cells 408 are cells that connect to one or more other GPU domains.

In various embodiments, once the cells within the respective domains of the GPUs 401, 402, 403 and 404 have been arranged to include the designated interior and boundary cells, the data exchange between the boundary cells is initiated. In various embodiments, once the data exchange between the boundary cells is completed, computation on the data included within the interior cells of a respective GPU is initiated. In various embodiments, the computation on the data included in the interior cells of a given GPU may be initiated before the completion of the data exchange associated with the boundary cells for that same GPU. Upon completion of the data exchange associated with a set of boundary cells for a given GPU, the respective GPU associated with the set of boundary cells may initiate computation of the exchanged data that is then resident in the boundary cells. In various embodiments, computation of the data included within the interior cells may include accessing data included in the boundary cells of a same GPU once the exchange of data associated with the respective boundary cells has been competed for that particular GPU domain.

In various embodiments, completion of the operations performed by the GPU on the data included within the interior cells of the GPU's domain may generate data that is then pushed out to the boundary cells, and thus made available for exchange with another GPU's boundary cells for further computation in one or more other GPU's domain(s). Advantage of the use of both the interior cells and the boundary cells for the domain of multiple GPUs includes having specific locations for data to be exchanged between the GPU allocated by placing the data to be exchanged in pre-determined data cell(s), and the ability to begin processing of the data included within the interior cell(s) without the need for data from other GPU to be exchanged, which reduces the overall processing time needed to complete the data computation to be performed by any given GPU.

The total number of GPUs illustrated in FIG. 4 is provided as a non-limiting example, and the number of GPUs utilized in a system configured to have GPU domains utilizing interior and boundary cells as described above may include a smaller or a larger number of GPUs compared to the four GPUs illustrated in diagram 400. Further, the number of interior cells and the number of boundary cells as illustrated and described with respect to GPUs illustrated in FIG. 4 is provided as a non-limiting example. GPU domains in various embodiments may include a smaller or a larger number of interiors cells, and/or a smaller or a larger number of boundary cells for any given GPU domain. In addition, although illustrated in FIG. 4 as having a same number of boundary cells per GPU, in various embodiments various ones of the GPUs that include interior cells and boundary cells may have a different number of interior cells and/or a different number of boundary cells relative to the number of interior cell and/or the number of boundary cells included in another GPU or in other GPU domains. Further, embodiments of the interior cells and boundary cells included in a given domain for a particular GPU are not limited to having a one-to-one correspondence with respect to the number of interior cells relative to the number of boundary cells. In various embodiments, the total number or interior cells may be a smaller, larger, or a same number of cells relative to the number of boundary cells allocated for a given GPU domain.

Figure 5:
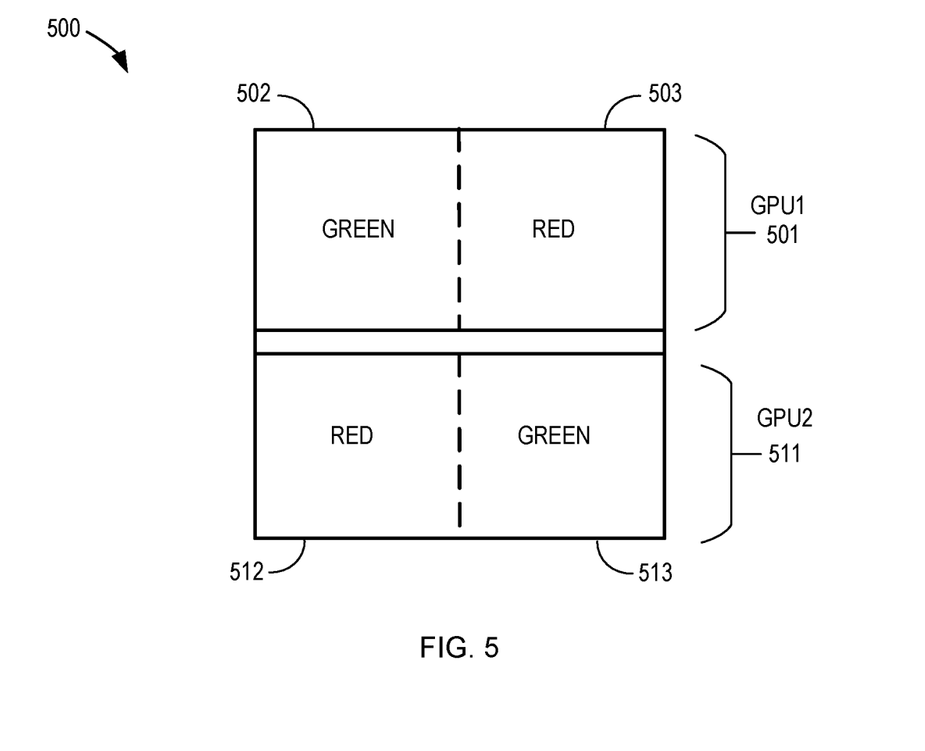
FIG. 5 is a block diagram illustrating of a plurality of GPUs domains having designated computational sub-domains according to various embodiments.

FIG. 5 is a block diagram 500 illustrating of a plurality of GPU domains having designated computational sub-domains according to various embodiments. Two separate GPU computational domains are illustrated in diagram 500, including a first computational domain 501 represented by sub-domains 502 and 503, and a second computational domain 511 represented by sub-domains 512 and 513. In various embodiments, the first computational domain 501 is configured to be accessed and operated on by a first GPU, and the second computational domain 511 is configured to be accessed by and operated on by a second and different GPU.

As shown in diagram 500, the first computational domain 501 is divided into a first sub-domain 502 having a designation of "GREEN" and a second sub-domain 503 having a designation of "RED." Similarly, the second computational domain 511 is divided into a first sub-domain 512 having a designation "RED" and a second sub-domain 513 having a designation "GREEN." As such, each GPU computational domain comprises multiple sub-domains with different color designations for each sub-domain. In various embodiments, the computation for each computational domain proceeds according to the order of colors. For example, the GPU associated with computational domain 501 operates on the data included in the "GREEN" sub-domain 502 first, and then operates on the data included in the "RED" sub-domain 503.

Similarly, the GPU associated with computational domain 511 operates on the data included in the "GREEN" sub-domain 513 first, and then operates on the data included in the "RED" sub-domain 512. The sub-domains are designated (e.g., "colored") in such a way that the same color does not connect each other. In various embodiments, different colored domains are not connected if the two domains do not share an interface or a boundary. In various embodiments, there is no data dependence in the same color, e.g., there is no data dependency between a first sub-domain assigned a first color designation and any other sub-domains in that same computational unit that has been designated with the same first color.

In various embodiments, the various designations are determined by user inputs, or in other embodiments may be determined automatically by the reservoir simulation software. In addition, embodiments are not limed to a particular number of designated sub-domains per computational domain, and may include any number of designations per computational domain. Further, the division of computational domains into sub-domains may be performed using a different number of sub-domains included in different ones of the computational sub-domains. Further, embodiments that include assigning designations to sub-domains within a computational domain are not limited to any particular type of designation, such as color. Designations for the sub-domains within a computational domain may be assigned using letters, numbers, and/or any other type of designation that may be used to assign an order in which the sub-domain are to be accessed and computed by the associated GPU for that computational domain.

Figure 6:
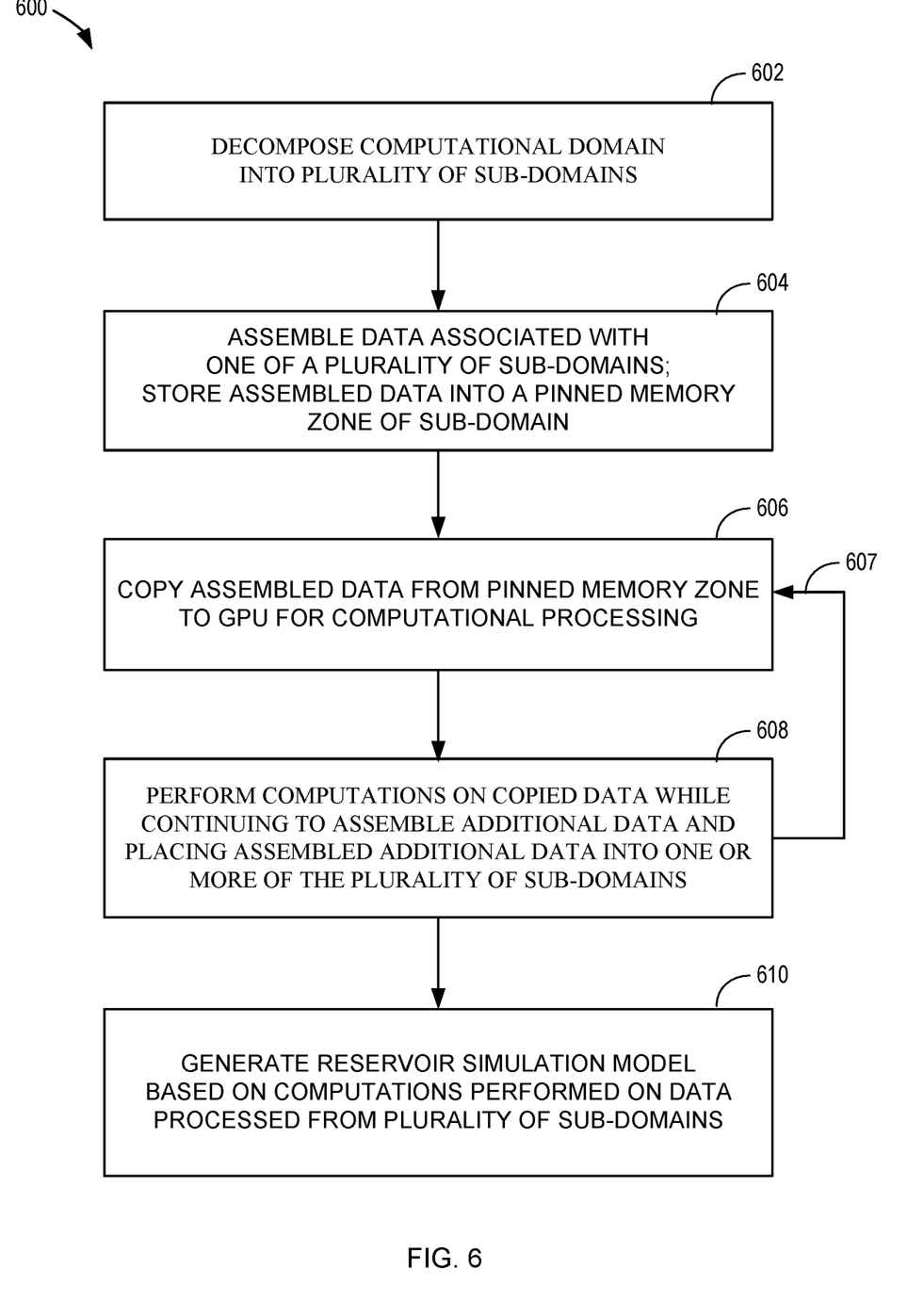
FIG. 6 is a flowchart illustrating a method according to various embodiments.

FIG. 6 is a flowchart illustrating a method 600 according to various embodiments. The flowchart is provided as an aid in understanding the illustrations and is not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus for example but not limited to the CPUs and GPUs of computing system 101 as illustrated and described in FIG. 1 of the present application. The method may include method steps performed by any of the devices and apparatus as described throughout this disclosure, or any equivalents thereof.

Embodiments of method 600 include decomposing a computational domain including data corresponding to a formation associated with a natural gas and/or an oilfield reservoir into a plurality of sub-domains (block 602).

Embodiments of method 600 include assembling data associated with one of the plurality of sub-domains, and storing the assembled data into a pinned memory zone of the sub-domain (block 604). In various embodiments, the assembly of the data and the storing of the assembled data is performed by a general or central processing unit (CPU) that is communicatively coupled to one or more graphical processing units (GPUs).

Embodiments of method 600 include copying the assembled data from the pinned memory zone of the sub-domain to a GPU of the one or more GPUs for computational processing (block 606).

Embodiments of method 600 include performing computations on the copied data, using the GPU, while continuing to assemble additional data and placing the assembled additional data into one or more of the plurality of sub-domains using the CPU (block 608). Placing the assembled additional data into one or more of the plurality of sub-domains may include placing the assembled data into one or more pinned memory zone(s) of the sub-domain(s).

Embodiments of method 600 may include further copying of copying the additional assembled data from the pinned memory zone of the sub-domain to a GPU of the one or more GPUs for computational processing, as represented by arrow 607 extending from block 608 to block 606. After copying the additional data to the GPU, embodiments of method 600 may include returning to block 608, where the GPU performs computations on the newly copied additional data. This iterative process of assembling data, storing the assembled data to a pinned memory zone of a sub-domain, copying the assembled and stored data to a GPU, and processing the copied data by the GPU may be repeated any number of times, for example until all of the data included in the original computational domain has been processed. Embodiments of method 600 may include processing the data included in the sub-domains according to a color designation, or other type of sub-domain designation, as described above with respect to FIG. 5.

Referring again to FIG. 6, embodiments of method 600 may include generating an output comprising a reservoir simulation model based on the computations performed by the GPU on the data processed from the plurality of sub-domains (block 610). In various embodiments, method 600 includes generating an output while the computation on the data by the GPU is still progressing. In various embodiments, method 600 includes generating an output only when all of the data included in the original computation domain has been computed by the GPU.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

While the aspects of the disclosure are described with reference to various implementations and exploitations, it will be understood that these aspects are illustrative and that the scope of the claims is not limited to them. In general, techniques for automatically pressure testing frac iron described herein may be implemented with facilities consistent with any hardware system or hardware systems. Many variations, modifications, additions, and improvements are possible.

Moreover, those skilled in the art will appreciate embodiments as disclosed herein may be practiced with a variety of computer system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may be implemented in connection with various hardware, software or a combination thereof, in a computer system or other processing system.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example embodiments include the following.

Example 1. A method comprising: decomposing a computational domain for a reservoir simulation into a plurality of sub-domains; assembling, using a CPU processor, a first set of data associated with a first one of the plurality of sub-domains, and storing the assembled data to a pinned memory zone; copying to a graphical processing unit (GPU) the data from the pinned memory zone to a graphical processing unit (GPU); performing computations on the copied data, using the GPU, while the CPU processor continues to assemble additional data and place the assembled additional data into one or more of the plurality of sub-domains; and generating, using the GPU, a reservoir simulation model based on computations performed on the data processed by the GPU from the plurality of sub-domains.

Example 2. The method of example 1, wherein the computation performed by the GPU on any given one of the sub-domains is decoupled from the computation performed on any other sub-domains of the plurality of sub-domains.

Example 3. The method of examples 1 or 2, further comprising: decomposing one or more of the sub-domains into a smaller sub-domains; and for each of the smaller sub-domains, assembling, by the CPU processor, that data from a first one of the smaller sub-domains and copying the assembled data from the first on one of the smaller sub-domains to the GPU for processing while continuing to assemble, using the CPU processor, data in one or more additional smaller sub-domains.

Example 4. The method of any of examples 1-3, wherein the GPU comprises a cluster of graphical processing units (GPUs), and wherein each GPU of the cluster of GPUs accesses data from one or more additional GPUs included in the cluster.

Example 5. The method of example 4, further comprising: dividing a set of computational cells associated with a domain of a first GPU of the cluster of GPUs into one or more boundary cells and a set of interior cells; initiating the exchange of data included in the one or more boundary cells with GPUs of the cluster; and while completing the exchange of data included in the one or more boundary cells, initiate, using the first GPU, computation of the data included in the set of interior cells.

Example 6. The method of example 5, further comprising: upon completion of the exchange of data included in the one or more boundary cells, performing, using the first GPU, computation on the data included in the one or more boundary cells.

Example 7. The method of any of examples 1-6, further comprising: assigning a designation to each of the sub-domains of the plurality of sub-domains; and performing computations, by the GPU, on the data within each of the sub-domains in an order based on the assigned designations.

Example 8. The method of example 7, wherein there is no data dependence between sub-domains having a same designation.

Example 9. A computing system comprising: a computer memory comprising data associated with a formation arranged in a computation domain; and a computing system coupled to the computer memory, the computing system comprising one or more central processing units (CPUs) and one or more graphical processing units (GPSs) coupled to the CPU; wherein the one or more CPUs are configured to decompose the computational domain into a plurality of sub-domains to assemble a first set of data associated with a first sub-domain of the plurality of sub-domains, and to store the assembled data to a pinned memory zone within the first sub-domain, and wherein the one or more GPUs are configured to copy data from the pinned memory zone of the first sub-domain and to perform computations on the copied data while the one or more CPUs continue to assemble additional data and place the assembled additional data into one or more of the plurality of sub-domains, the GPUs further configured to continue to copy data from the one or more of the plurality of sub-domains as the one or more CPUs provide assembly data to the respective plurality of sub-domains, and to generate outputs representative of a reservoir simulation model based on the computations performed on the data processed by the GPU from the plurality of sub-domains.

Example 10. The computing system of example 9, wherein the any given one of the sub-domains is decoupled from the any other sub-domains of the plurality of sub-domains.

Example 11. The computing system of examples 9 or 10, wherein the CPU is further configured to decompose one or more of the sub-domains into a smaller sub-domains, and for each of the smaller sub-domains, assemble the data from a first one of the smaller sub-domains and copy the assembled data from the first on one of the smaller sub-domains to the GPU for processing while continuing to assemble data in one or more additional smaller sub-domains.

Example 12. The computing system of any of examples 9-11, wherein the GPU comprises a cluster of graphical processing units (GPUs), and wherein each GPU of the cluster of GPUs is configured to accesses data from one or more additional GPUs included in the cluster.

Example 13. The computing system of example 12, wherein the cluster of GPUs is configured to directly communicate with one or more GPUs within the cluster of GPUs to exchange processed data without going through the CPU.

Example 14. The computing system of example 12, wherein at least one GPU of the cluster of GPUs is further configured to: divide a set of computational cells associated with a domain of the at least one GPU into one or more boundary cells and a set of interior cells; initiate the exchange of data included in the one or more boundary cells with other GPUs of the cluster of GPUs; and while completing the exchange of data included in the one or more boundary cells, initiate computation of the data included in the set of interior cells.

Example 15. The computing system of example 14, wherein the at least one GPUs is further configured to, upon completion of the exchange of data included in the one or more boundary cells, perform computation on the data included in the one or more boundary cells.

Example 16. The computing system of example 9, wherein the system is further configured to: assign a designation to each of the sub-domains of the plurality of sub-domains; and perform computations, using the GPU, on the data within each of the sub-domains in an order based on the assigned designations.

Example 17. The computing system of example 15, wherein there is no data dependence between sub-domains having a same designation.

Example 18. One or more non-transitory machine-readable media comprising program code executable by a computing system including one or more processors (CPUs) communicatively coupled to one or more graphical processing units (GPUs), the program code including instructions to cause a computing system to: decomposing a computational domain for a reservoir simulation into a plurality of sub-domains; assemble, using a processor, a first set of data associated with a first one of the plurality of sub-domains, and storing the assembled data to a pinned memory zone; copy to a graphical processing unit (GPU) the data from the pinned memory zone to a graphical processing unit (GPU); perform computations on the copied data, using the GPU, while the processor continues to assemble additional data and place the assembled additional data into one or more of the plurality of sub-domains; and generate, using the GPU, a reservoir simulation model based on computations performed on the data processed by the GPU from the plurality of sub-domains.

Example 19. The one or more non-transitory machine-readable media of example 18, wherein the program code further includes instructions to cause a computing system to: divide a set of computational cells associated with a domain of at least one GPU into one or more boundary cells and a set of interior cells; initiate the exchange of data included in the one or more boundary cells with other GPUs of the cluster of GPUs; and while completing the exchange of data included in the one or more boundary cells, initiate computation of the data included in the set of interior cells.

Example 20. The one or more non-transitory machine-readable media of examples 18 or 19, wherein the program code further includes instructions to cause a computing system to: assign a designation to each of the sub-domains of the plurality of sub-domains; and perform computations, using the GPU, on the data within each of the sub-domains in an order based on the assigned designations.

What is claimed is:

1. A method comprising:
    decomposing a computational domain for a reservoir simulation into a plurality of sub-domains;
    assembling, using a CPU processor, a first set of data associated with a first one of the plurality of sub-domains, and storing the assembled data to a pinned memory zone;
    copying to a graphical processing unit (GPU) the data from the pinned memory zone to a graphical processing unit (GPU);
    performing computations on the copied data, using the GPU, while the CPU processor continues to assemble additional data and place the assembled additional data into one or more of the plurality of sub-domains; and
    generating, using the GPU, a reservoir simulation model based on computations performed on the data processed by the GPU from the plurality of sub-domains.

2. The method of claim 1, wherein the computation performed by the GPU on any given one of the sub-domains is decoupled from the computation performed on any other sub-domains of the plurality of sub-domains.

3. The method of claim 1, further comprising:
    decomposing one or more of the sub-domains into a smaller sub-domains; and
    for each of the smaller sub-domains, assembling, by the CPU processor, that data from a first one of the smaller sub-domains and copying the assembled data from the first on one of the smaller sub-domains to the GPU for processing while continuing to assemble, using the CPU processor, data in one or more additional smaller sub-domains.

4. The method of claim 1, wherein the GPU comprises a cluster of graphical processing units (GPUs), and wherein each GPU of the cluster of GPUs accesses data from one or more additional GPUs included in the cluster.

5. The method of claim 4, further comprising:
    dividing a set of computational cells associated with a domain of a first GPU of the cluster of GPUs into one or more boundary cells and a set of interior cells;
    initiating the exchange of data included in the one or more boundary cells with GPUs of the cluster; and
    while completing the exchange of data included in the one or more boundary cells, initiate, using the first GPU, computation of the data included in the set of interior cells.

6. The method of claim 5, further comprising:
    upon completion of the exchange of data included in the one or more boundary cells, performing, using the first GPU, computation on the data included in the one or more boundary cells.

7. The method of claim 1, further comprising:
assigning a designation to each of the sub-domains of the plurality of sub-domains; and
performing computations, by the GPU, on the data within each of the sub-domains in an order based on the assigned designations.

8. The method of claim 7, wherein there is no data dependence between sub-domains having a same designation.

9. A computing system comprising:
a computer memory comprising data associated with a formation arranged in a computation domain; and
a computing system coupled to the computer memory, the computing system comprising one or more central processing units (CPUs) and one or more graphical processing units (GPSs) coupled to the CPU;
wherein the one or more CPUs are configured to decompose the computational domain into a plurality of sub-domains to assemble a first set of data associated with a first sub-domain of the plurality of sub-domains, and to store the assembled data to a pinned memory zone within the first sub-domain, and
wherein the one or more GPUs are configured to copy data from the pinned memory zone of the first sub-domain and to perform computations on the copied data while the one or more CPUs continue to assemble additional data and place the assembled additional data into one or more of the plurality of sub-domains,
the GPUs further configured to continue to copy data from the one or more of the plurality of sub-domains as the one or more CPUs provide assembly data to the respective plurality of sub-domains, and to generate outputs representative of a reservoir simulation model based on the computations performed on the data processed by the GPU from the plurality of sub-domains.

10. The computing system of claim 9, wherein the any given one of the sub-domains is decoupled from the any other sub-domains of the plurality of sub-domains.

11. The computing system of claim 9, wherein the CPU is further configured to decompose one or more of the sub-domains into a smaller sub-domains, and for each of the smaller sub-domains, assemble the data from a first one of the smaller sub-domains and copy the assembled data from the first on one of the smaller sub-domains to the GPU for processing while continuing to assemble data in one or more additional smaller sub-domains.

12. The computing system of claim 9, wherein the GPU comprises a cluster of graphical processing units (GPUs), and wherein each GPU of the cluster of GPUs is configured to accesses data from one or more additional GPUs included in the cluster.

13. The computing system of claim 12, wherein the cluster of GPUs is configured to directly communicate with one or more GPUs within the cluster of GPUs to exchange processed data without going through the CPU.

14. The computing system of claim 12, wherein at least one GPU of the cluster of GPUs is further configured to:
divide a set of computational cells associated with a domain of the at least one GPU into one or more boundary cells and a set of interior cells;
initiate the exchange of data included in the one or more boundary cells with other GPUs of the cluster of GPUs; and
while completing the exchange of data included in the one or more boundary cells, initiate computation of the data included in the set of interior cells.

15. The computing system of claim 14, wherein the at least one GPUs is further configured to, upon completion of the exchange of data included in the one or more boundary cells, perform computation on the data included in the one or more boundary cells.

16. The computing system of claim 9, wherein the system is further configured to:
assign a designation to each of the sub-domains of the plurality of sub-domains; and
perform computations, using the GPU, on the data within each of the sub-domains in an order based on the assigned designations.

17. The computing system of claim 15, wherein there is no data dependence between sub-domains having a same designation.

18. One or more non-transitory machine-readable media comprising program code executable by a computing system including one or more processors (CPUs) communicatively coupled to one or more graphical processing units (GPUs), the program code including instructions to cause a computing system to:
decomposing a computational domain for a reservoir simulation into a plurality of sub-domains;
assemble, using a CPU processor, a first set of data associated with a first one of the plurality of sub-domains, and storing the assembled data to a pinned memory zone;
copy to a graphical processing unit (GPU) the data from the pinned memory zone to a graphical processing unit (GPU);
perform computations on the copied data, using the GPU, while the CPU processor continues to assemble additional data and place the assembled additional data into one or more of the plurality of sub-domains; and
generate, using the GPU, a reservoir simulation model based on computations performed on the data processed by the GPU from the plurality of sub-domains.

19. The one or more non-transitory machine-readable media of claim 18, wherein the program code further includes instructions to cause a computing system to:
divide a set of computational cells associated with a domain of at least one GPU into one or more boundary cells and a set of interior cells;
initiate the exchange of data included in the one or more boundary cells with other GPUs of the cluster of GPUs; and
while completing the exchange of data included in the one or more boundary cells, initiate computation of the data included in the set of interior cells.

20. The one or more non-transitory machine-readable media of claim 18, wherein the program code further includes instructions to cause a computing system to:
assign a designation to each of the sub-domains of the plurality of sub-domains; and
perform computations, using the GPU, on the data within each of the sub-domains in an order based on the assigned designations.

* * * * *